Feb. 28, 1950 W. D. CRAIN 2,498,650
DUMP HAYRAKE
Filed July 3, 1945 2 Sheets-Sheet 1
FIGURE 1.
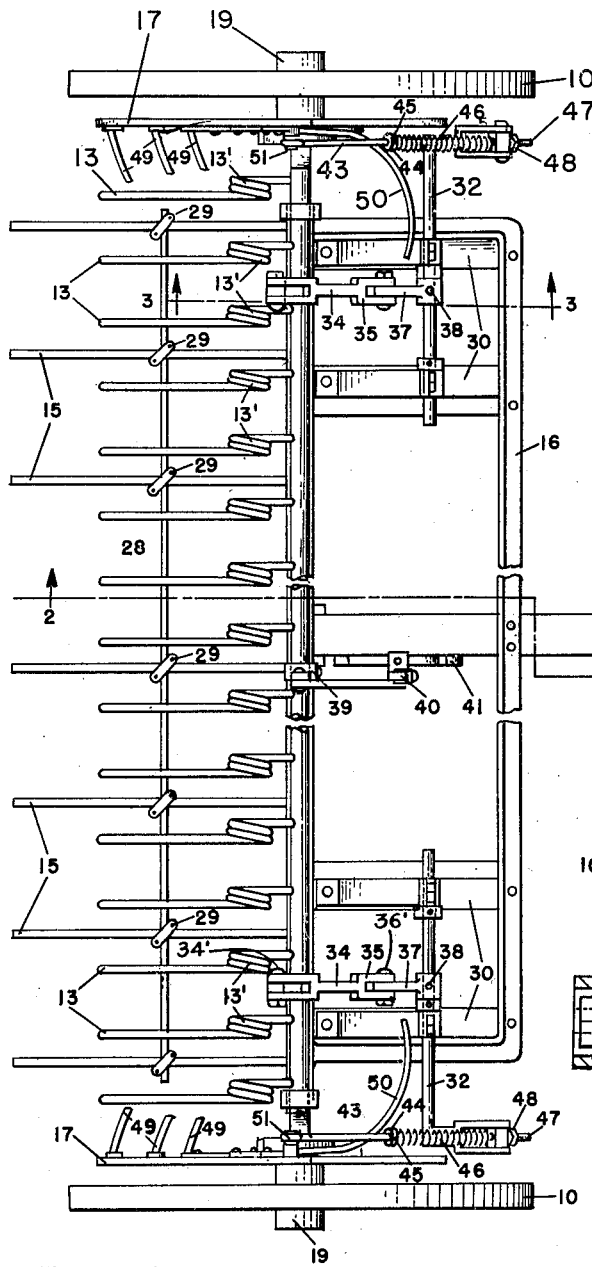
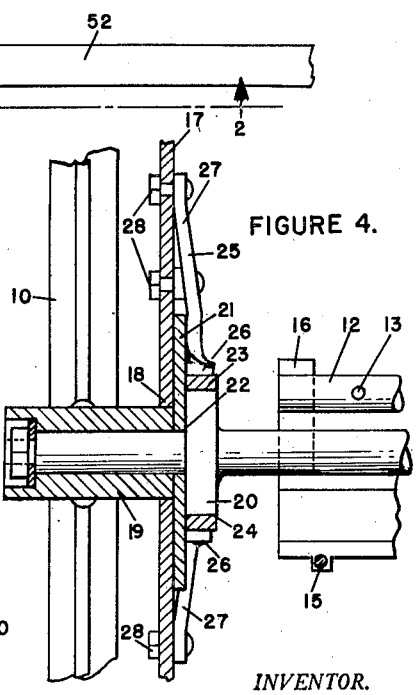
FIGURE 4.
WITNESSES:
INVENTOR.
WILLIAM D. CRAIN
BY Victor J. Evans & Co.
ATTORNEYS Feb. 28, 1950 W. D. CRAIN 2,498,650
DUMP HAYRAKE
Filed July 3, 1945 2 Sheets-Sheet 2

WITNESSES:

INVENTOR.
WILLIAM D. GRAIN
BY
*Victor J. Evans & Co.*
ATTORNEYS

Patented Feb. 28, 1950

2,498,650

UNITED STATES PATENT OFFICE 2,498,650

DUMP HAYRAKE

William D. Crain, Stoneham, Colo.

Application July 3, 1945, Serial No. 603,015

4 Claims. (Cl. 56—395)

This invention relates to dump hay rakes and more especially to a hay rake equipped with means for preventing the lateral displacement of the load of the rake.

One object of the invention is to provide a hay rake with means for stripping the load from the rake, during dumping thereof.

Another object of the invention is to prevent the load from catching in the wheels and being wound around the axle or tangled with the frame of the machine.

A further object of the invention is to furnish a device for insuring a clean raking operation by preventing hay or other cuttings from dropping from the ends of the rake.

With the above and other objects in view, the invention consists of certain novel details of construction and combination of parts hereinafter more fully described and claimed, it being understood that various modifications may be resorted to within the scope of the appended claims without departing from the spirit or sacrificing any of the advantages of the invention.

The invention will be readily understood by reference to the accompanying drawings forming a part of this specification in which:

Figure 1 is a top plan view of an embodiment of the invention.

Figure 4 is a detailed sectional view on the line 4—4 of Figure 3.

Figure 2:
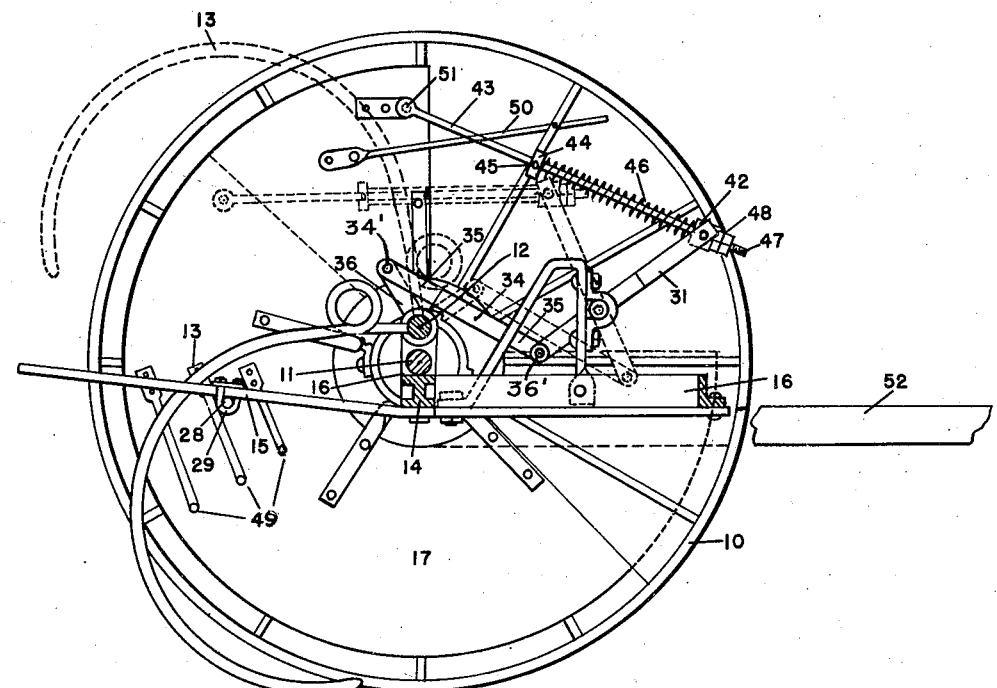
Figure 2 is a sectional view on the line 2—2 of Figure 1 showing the rake and fender in dotted lines in unloading position.
Figure 3:
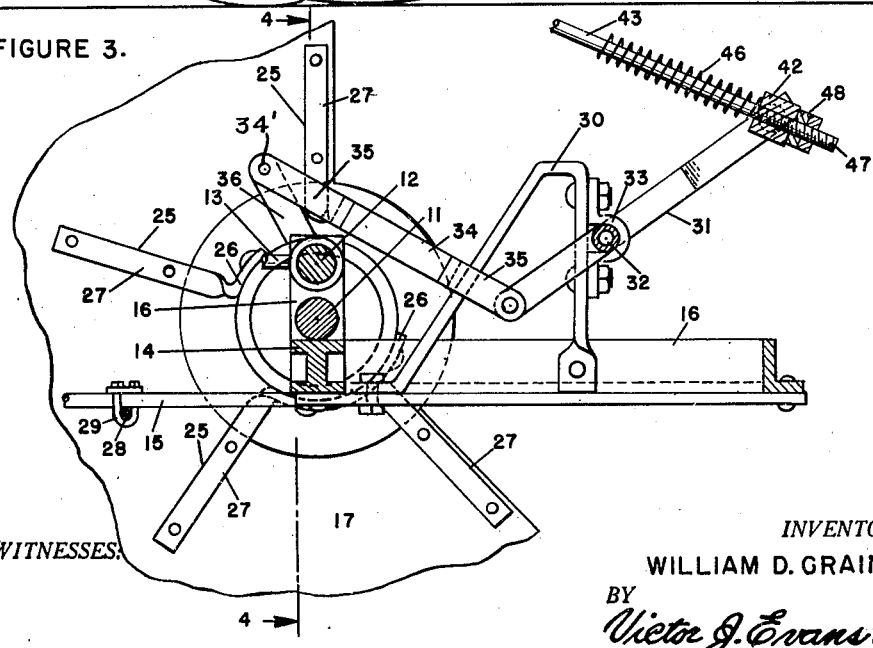
Figure 3 is a sectional view on line 3—3 of Figure 1.

Referring more particularly to the drawings in detail in which like characters of reference designate similar and corresponding parts in the various views, the numeral 10 indicates the wheels of the hay rake 11, the axle upon which the wheels 10 are journalled and 12 the rake head from which the teeth 13 project. Each of the teeth 13 are formed into coils 13' adjacent to the head 12 to increase the resiliency of the teeth 13 in the ordinary manner.

Below the axle 11 is a cross bar 14 of the frame 16 of the machine. Projecting rearwardly from the cross bar 14 and connected thereto are bars or fingers 15 which are adapted to strip the hay from the teeth 13 of the rake when the teeth are in raised positions as shown in Figure 2 in dotted lines.

A rod 28 extends transversely of the bars or fingers 15 and is connected to the bars 15 by means of U-bolts 29. The rods 28 retain the bars in spaced relation to each other and position them in proper relation to the teeth 13.

Fenders 17 comprising a substantially semi-circular plate of sheet metal or other suitable material are arranged vertically between the rake teeth 13 and the wheels 10 and are provided with concentric openings 18 which are adapted to conform to the hub 19 of the wheel 10. These fenders are balanced with relation to the weight of the rake teeth 13.

Positioned between a circular hub flange 20 and the hub 19 of the wheel 10 is a circular guide plate 21 having a central axle conforming opening 22 therein and the plate 21 is adapted to retain the fender 17 in position on the wheel hub 19.

A circular hub flange collar 23 having a hub flange conforming opening 24 therein is positioned on the hub flange 20 and is secured to the fender 17 by means of laterally extending fingers or brackets 25 which consist of a portion 26 conforming to the hub collar 23 and laterally extending portions 27 formed at right angles thereto which are secured rigidly to the fender 17 by means of bolts and nuts 28.

These portions 27 of the brackets 25 guard against lateral vibration of the fenders 17 and support the fenders on the hub flange 20.

Brackets 30 secured to the frame 16 have rods 32 pivotally mounted thereon. Bifurcated levers 31 are formed integral with and extend at right angles to one of the ends of the rods 32. Links 34 having bifurcated ends 35 are pivoted at one of their ends by the bolt 34' to link 36 which are connected to the rake head 12. The other ends of the links 34 are pivotally connected by the bolt 36' to bearing links 37 which are provided with set screws 38 to hold the bearing portions of the links 37 in position on the rod 32.

Midway of the ends of the rake head 12 is a bearing link 39 which is connected with a handle 40. The handle 40 is provided with the usual dog adapted to contact the ratchet 41 to maintain the rake in position when it is raised or lowered by means of the handle 40.

A bearing 42 pivotally mounted on the bifurcated end of the lever 31 is adapted to slidably receive a bar 43 which is pivotally connected to the fender 17 at 51.

A circular collar 44 is provided with a set screw 45 to retain the collar 44 in place on the bar 43, a circular spring 46 is positioned on the bar 43 having one end thereof contacting the collar 44 and the other end thereof contacting the pivot bearing 42.

Tension on the spring is provided by having one end of the bar 43 screw-threaded at 47 and complementary screw-threaded nuts 48 threaded thereon. Therefore, by tightening and loosening the nuts 48 tension is placed on the spring and maintains the balanced fender in proper position with relation to the teeth 13.

Therefore, when the handle 40 is moved to operate the rake head 12, the fender 17 will be moved to the position shown in dotted lines in Figure 2. This will tend to remove the hay from the rake fingers 13 when the load is released.

Fingers 49 secured to the fender 17 will also assist in removing the hay from the fingers 13.

Arcuate members 50 connected to the fender 17 will contact the raised teeth 13 of the rake and prevent the balanced fender from revolving to a greater extent than is desired.

The hay rake is provided with a pole or shaft 52 which extends forwardly from the frame 16 and is provided in order that the hay rake may be towed or drawn in any convenient manner either by animal or tractor.

In operation, the hay is gathered in the usual manner, but the tendency of the hay to spread is prevented by the fender which thus not only eliminates the usual waste in raking short grasses, but also eliminates the trouble caused by long grasses, particularly, in windy weather since the fender checks the wind and prevents the hay from climbing the wheels and being entangled therein and prevents the dumping of the rake.

Also, when the rake is operated, the rods and fingers on the fender force the grass out of the rake teeth and thus completes a faster dumping of the hay. The operation of the rake causes the operation of the fender in unison therewith.

From the above description, it will be seen that there has been provided a rake which embodies the advantageous features described and which may be modified in various particulars without departing from the spirit of the invention or the scope of the appended claims.

What is claimed is:

1. A device of the character described, comprising a hay rake having supporting wheels, of a pair of semi-circular vertical fenders, one positioned between each wheel and the related end of the rake, downwardly inclined bars pivoted to the upper end of said fenders, horizontal rods journalled transversely of said rake, forwardly of said fenders having upwardly extending portions at right angles to said rods pivotally connected to said bars, means for operating said rake connected to said horizontal rods, whereby the operation of said rake will oscillate said fenders.

2. A device of the character described, comprising a hay rake having supporting wheels of a cross bar parallel to and below the axial line of the wheels, fingers extending rearwardly from said cross bar, a rod extending transversely of said fingers and secured thereto, said rod adapted to retain the fingers in spaced relation to each other and said fingers, a pair of semi-circular vertical fenders, one positioned between each wheel and the related end of the rake, downwardly inclined levers pivotally connected to the upper end of said fenders, horizontal rods journalled transversely of said rake forwardly of said fenders having upwardly extending portions at right angles to said rods pivotally connected to said bars, means for operating said rake connected to said horizontal rods, said fingers adapted to strip the teeth of said rake when said rake is raised to dumping position.

3. A device of the character described, comprising an axle, supporting wheels journalled on said axle, a rake positioned between the wheels, a circular hub flange formed integral with said axle, in spaced relation to the hub of said wheel, a circular collar carried by said hub flange, laterally extending brackets secured to said collar, semi-circular vertical fenders secured to said brackets, a guide plate having an axle conforming opening therein positioned between said hub flange and said fenders and stripping elements secured to said fenders.

4. The invention as described in claim 3 wherein a cross bar is provided in parallel relationship to said axle below the axial line of the wheels and stripping elements secured to said cross bars adapted to strip said hay rake when said hay rake is operated.

WILLIAM D. CRAIN.

REFERENCES CITED

The following references are of record in the file of this patent:

UNITED STATES PATENTS

| Number | Name | Date |
|---|---|---|
| 388,401 | Desautels | Aug. 28, 1885 |
| 586,447 | Mellinger | July 13, 1897 |
| 729,263 | Boothe | May 26, 1903 |
| 760,149 | Ramer | May 17, 1904 |
| 1,179,676 | Storm | Apr. 18, 1916 |